United States Patent Office 2,853,980
Patented Sept. 30, 1958

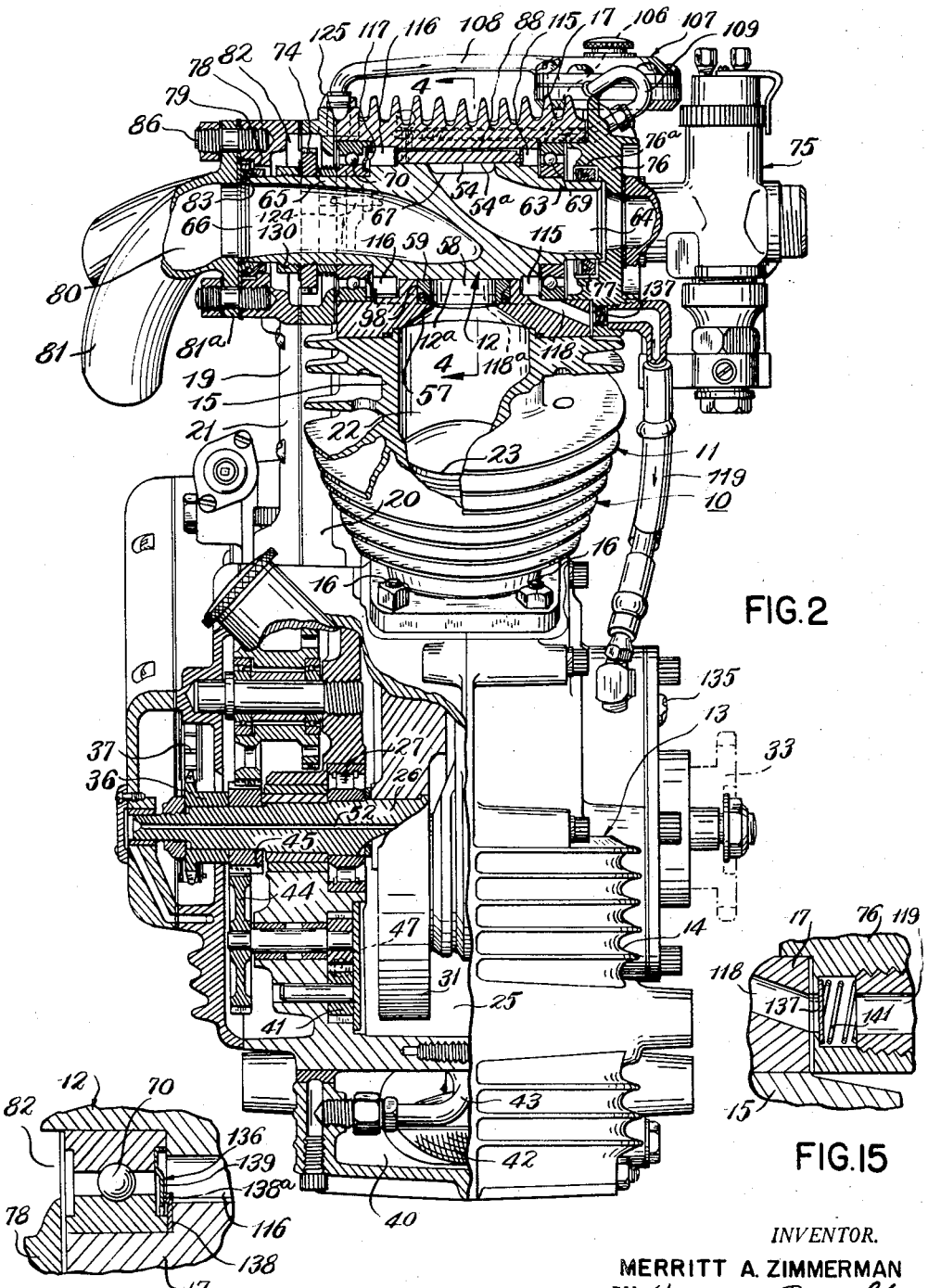

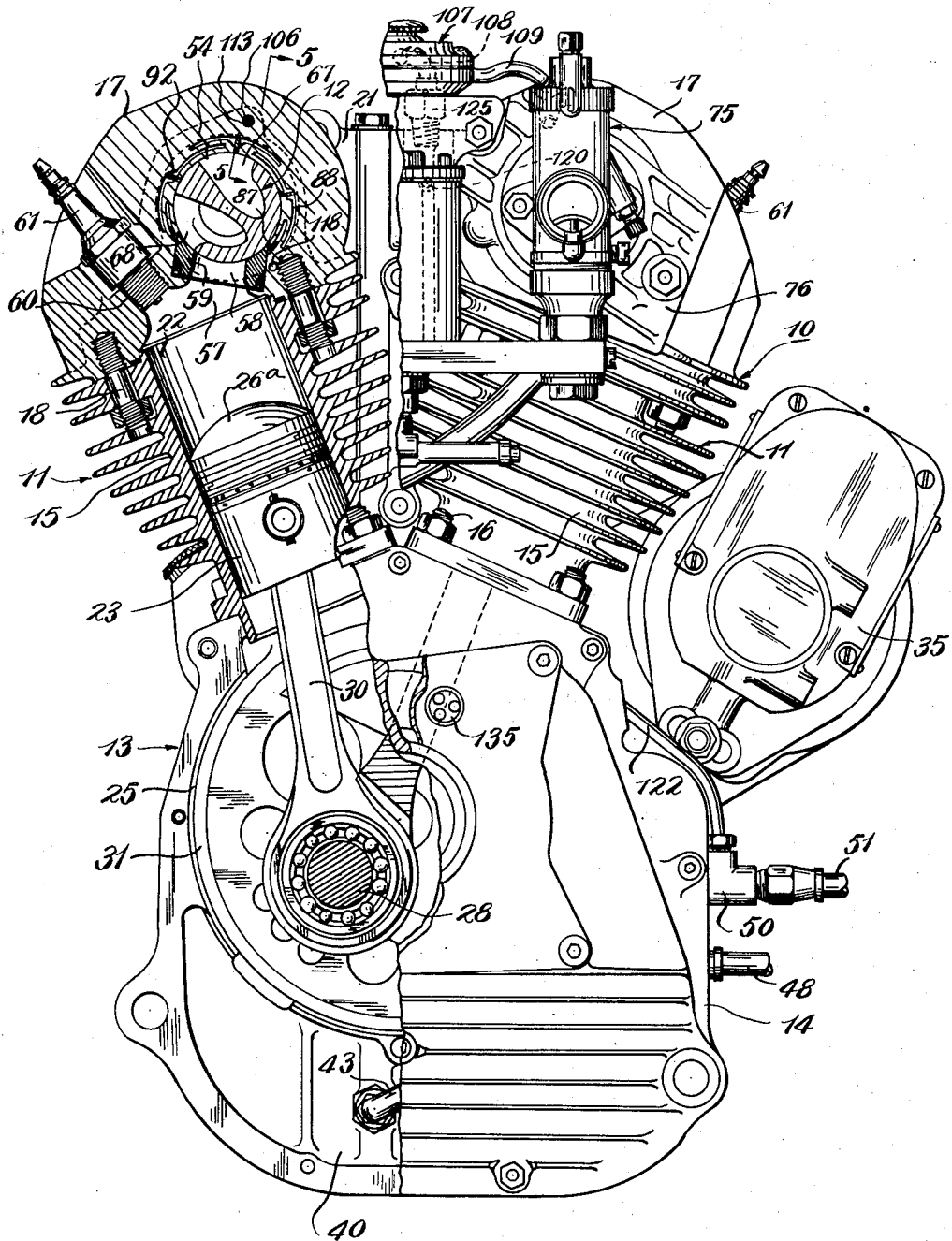

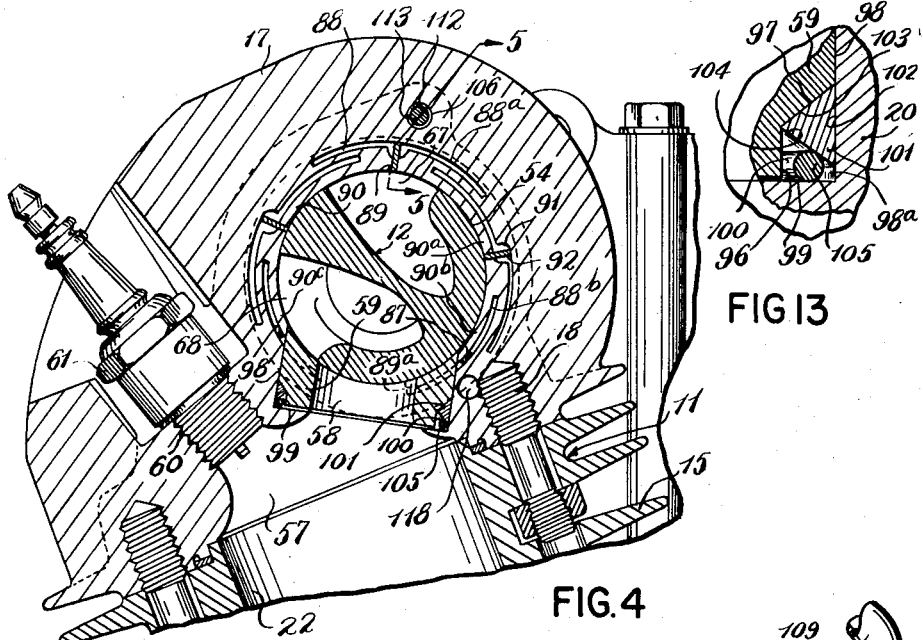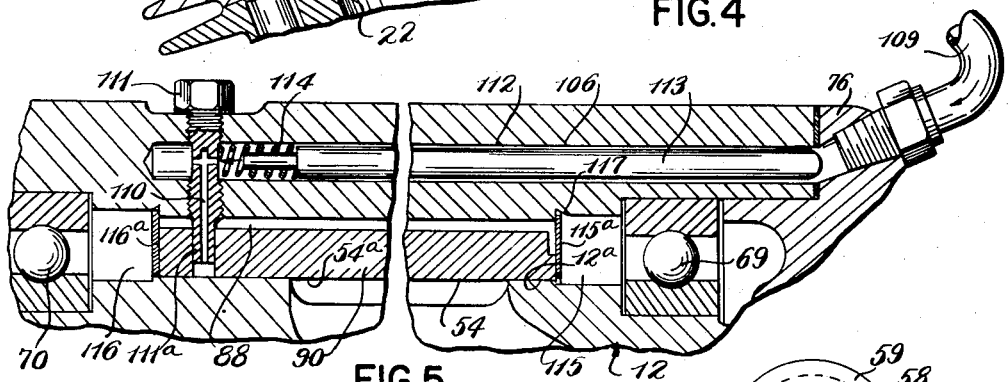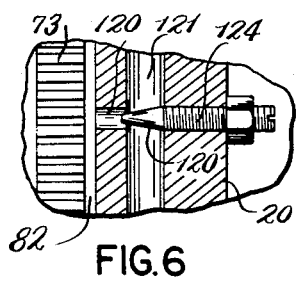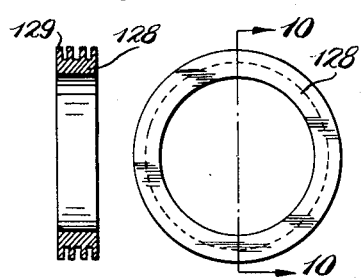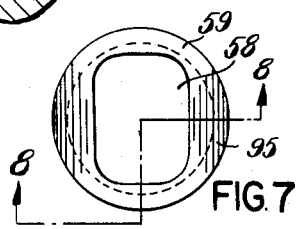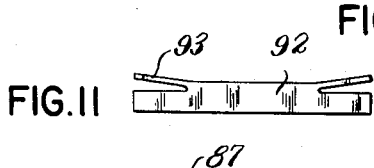

2,853,980

INTERNAL COMBUSTION ENGINE

Merritt A. Zimmerman, Cleveland, Ohio

Application August 29, 1955, Serial No. 531,081

24 Claims. (Cl. 123—41.4)

This invention relates to internal combustion engines and, more particularly, to novel engine construction employing rotary valves for controlling intake and exhaust communication with the power cylinders.

The theoretical advantages of an internal combustion engine having rotary valves instead of the conventional reciprocable poppet type valves have long been recognized but have not been fully obtainable because operating problems and difficulties encountered in connection with such rotary valves, such as the problems of sealing, distortion, lubrication, cooling, and cost and facility of manufacture have not been satisfactorily solved.

As one of its objects the present invention accordingly provides a novel rotary valve engine capable of high speed operation with high horsepower output per unit of weight and piston displacement, and in which efficient functioning of the rotary valves is obtainable for prolonged periods and with minimum attention or servicing during the expected life of the engine.

As contemplated in the objects of this invention, the rotary valve feature of this engine incorporates a design in which normal manufacturing tolerances are usable, without interfering adversely with the desired operation and life expectancy of the rotary valve, nor adversely affecting the normal operation of any part of the engine, and in which such servicing of the rotary valve as may be needed can be carried out by semi-skilled mechanics.

Another object is to provide a novel rotary valve engine having flexible wall means defining a bore for the rotary valve and in which flexing of the wall means accommodates expansion and contraction of the valve, such that a desired close-fitting relation can be maintained between the valve and the periphery of the bore throughout a wide range of operating temperatures and without binding or undue looseness.

A further object is to provide such a rotary valve engine in which the wall means defining the valve bore has slots therein dividing the periphery of the bore into arcuately extending yieldable segments.

Still another object is to provide a rotary valve engine having a ported sealing shoe, preferably of a high thermal conductivity, disposed between the power cylinder and its associated rotary valve and in which novel packing means cooperating with the shoe assures and maintains an effective sealing relationship between the parts.

It is also an object of the present invention to provide a rotary valve engine of the character above indicated, in which novel lubricant supply means insures a feeding of a proper amount of lubricant to the rotary valve, preferably with the lubricant being applied to the rotary valve at points thereof which are relatively remote from the ports of the valve and from the valve packings.

Yet another object is to provide a rotary valve engine in which the rotary valve has heat-dissipating surfaces thereon and relative to which surfaces a coolant fluid is passed in heat-exchange relation thereto.

Additionally, this invention provides a rotary valve engine of the character above referred to in which the rotary valve is driven by gear means located in a chamber to which lubricant is supplied and in which heat dissipating surfaces of the exhaust sleeve portion of the valve are disposed in such chamber for cooling contact by the lubricant.

The invention can be further briefly summarized as consisting in certain novel combinations and arrangements of parts hereinafter described and particularly set out in the claims hereof.

In the accompanying sheets of drawings forming a part of this specification:

Fig. 2 is a side elevation of the engine with portions thereof shown in axial section;

Fig. 3 is an end elevation of the intake end with portions of the engine shown in section;

Fig. 4 is a partial transverse section on a larger scale taken through the head and rotary valve of one of the cylinders, as indicated by section line 4—4 of Fig. 2;

Fig. 5 is a fragmentary axial section taken through the valve lubricating means, as indicated by section line 5—5 of Figs. 3 and 4;

Fig. 6 is a fragmentary vertical section taken on section line 6—6 of Fig. 1 and showing another portion of the lubricating means;

Fig. 7 is a top plan view of a valve sealing shoe shown in detached relation;

Fig. 8 is an elevation of the sealing shoe showing the same partially in section, as indicated by section line 8—8 of Fig. 7;

Fig. 9 is an end elevation of a finned cooling collar shown in detached relation;

Fig. 10 is a transverse section through the finned cooling collar taken on section line 10—10 of Fig. 9;

Fig. 11 is a side elevation showing a packing filler strip in detached relation;

Fig. 12 is an end elevation of the strip;

Fig. 13 is a fragmentary large-scale sectional view of the packing for the sealing shoe;

Fig. 14 is a large-scale fragmentary section corresponding with a portion of Fig. 2 and showing a valved-shield associated with one of the antifriction bearings of the rotary valve;

Fig. 15 is another large-scale fragmentary section corresponding with a portion of Fig. 2 and showing a check valve in a lubricant return passage; and Fig. 16 is a perspective view showing a segment deflecting spring in detached relation.

Figure 1:
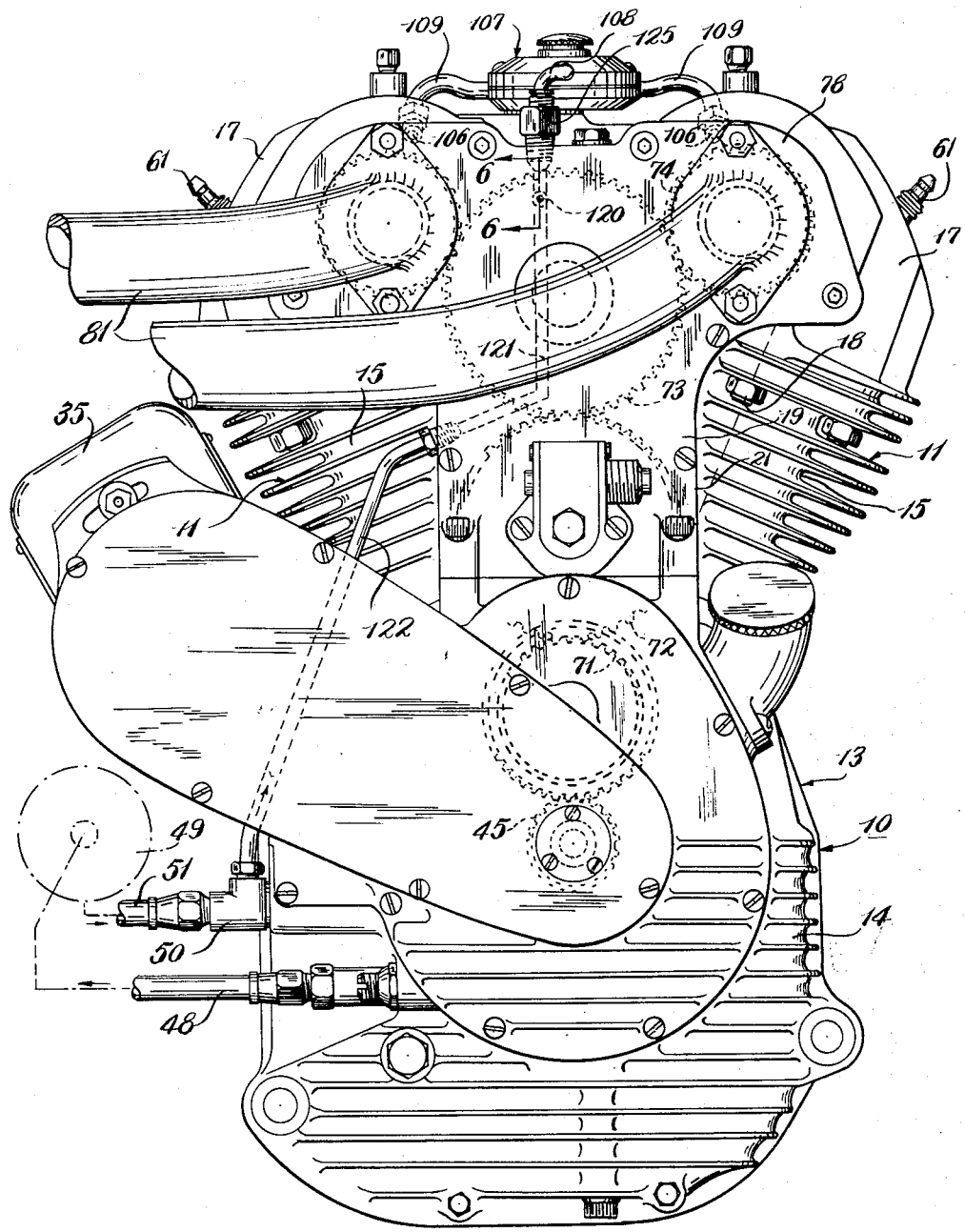
Fig. 1 is an end elevation of the exhaust end of a rotary valve engine embodying the present invention.

As one practical embodiment of the present invention, the drawings show a rotary valve engine 10 which is here represented as being a two-cylinder engine having the cylinders 11 thereof extending in an upwardly divergent relation, although the invention can be embodied in an engine having any desired number of cylinders in any desired arrangement. Since the rotary valve equipped cylinders 11 of the engine 10 are of substantially identical construction, only one of such cylinders and its associated rotary valve 12 need be described in detail herein.

The engine 10 is provided with a body 13 of a sectional construction which includes a crankcase 14, finned cylinder members or barrels 15 connected with such crankcase by studs 16, and cylinder heads 17 secured to the outer ends of the cylinder members by the studs 18. The engine body 13 also includes a pair of gear case members 19 and 20 which are suitably secured to other sections of the body and define a hollow gear column 21 extending upwardly from the crankcase 14 and spanning the V-space between the divergently disposed cylinder members 15.

The cylinder members 15 have cylinder bores 22 therein in which power pistons 23 are reciprocably operable. The crankcase 14 defines a crank chamber 25 with which the lower ends of the cylinder bores 22 communicate. A crankshaft 26 suitably mounted in antifriction support bearings 27 of the crankcase 14 extends across the crank chamber 25 and includes one or more cranks 28 with which the power pistons 23 are connected by connecting rods 30. The crankshaft 26 also includes one or more flywheel portions 31 rotatable in the crank chamber 25.

One end of the crankshaft 26 projects from the crankcase 14 and has a power take-off means thereon, such as the sprocket 33 shown in this instance. The other end of the crankshaft is adapted for driving various auxiliary devices including a magneto or generator 35, which is suitably mounted on the engine body 13 and is connected with a driving sprocket 36 of the crankshaft by a chain 37.

The lower portion of the crankcase 14 defines a lubricant reservoir 40, from which lubricant is withdrawn by a gear-type pump 41 through a suitable strainer 42 and suction pipe 43. The gear elements of the pump 41 are driven from the crankshaft 26 through a gear member 44 meshing with a pinion 45 of the crankshaft. The lubricant pump 41 has a delivery passage 47 through which lubricant is discharged under pressure for distribution to various points of the engine.

The lubricant delivered by the pump 41 through the outlet 47 is discharged into a pipe 48 leading away from the outside of the crankcase. The pipe 48 conducts the lubricant to a filter 49 from which the filtered lubricant is returned to a fitting 50 through the pipe 51. A portion of the filtered lubricant is supplied to the bearings of the crankshaft 26 through the passage 52 of the latter. Other portions of the filtered lubricant are distributed to other points of the engine, as will be further described hereinafter.

The cylinder head 17 has a valve bore 54 therein extending in a direction transverse to the axis of the cylinder bore 22. The rotary valve 12 is rotatable in the bore 54 and controls the intake and exhaust communication with the cylinder bore 22 through a compression space 57 and through the port 58 of a sealing shoe 59. The cylinder head 17 is also provided with a spark plug opening 60 in which a spark plug 61 is suitably mounted with the inner end of the spark plug presented to the compression space 57. The power piston 23 is here shown as having a dome-shaped upper end 23$^a$ adapted to extend into the compression space 57.

The rotary valve 12 has a hollow intake stem portion 63 on one end thereof containing an axially extending intake passage 64. The valve 12 also has a hollow exhaust stem portion 65 on the other end thereof defining an axially extending exhaust passage 66. The intermediate portion 12$^a$ of the valve is a cylindrical barrel portion provided with radial intake and exhaust ports 67 and 68 of suitable angular extent formed by the inner ends of the intake and exhaust passages 64 and 66 respectively. The ports 67 and 68 come into registration with the communicating port 58 in succession during rotation of the valve 12 in the bore 54.

The valve 12 is supported for rotation in the bore 54 by having its intake and exhaust sleeve portions 63 and 65 mounted in antifriction bearings 69 and 70. These bearings have their inner races mounted on the intake and exhaust sleeve portions 63 and 65 and have their outer races secured in annular seats of the cylinder head 17. The intermediate barrel portion 12$^a$ of the valve 12 has a relatively close-fitting running relation in the intermediate cylindrical portion 54$^a$ of the bore 54.

The rotary valve 12 is rotated in the bore 54 in properly-timed relation to the reciprocating movements of the piston 23 by being driven from the crankshaft 26 through a gear train located in the gear column 21. In this instance, the gear train comprises a lower gear member 71 meshing with the pinion 45 of the crankshaft, an idler gear 72 and an upper gear 73. The exhaust end of the rotary valve 12 is connected with the upper gear 73 through a gear member 74 fixed on the exhaust sleeve portions 65 and meshing with such upper gear.

Explosive mixture is supplied to the intake passage 64 of the rotary valve 12 by a suitable charge-forming device or carburetor 75. The cylinder head 17 is provided with a suitable cover 76 on the intake end thereof and to which the carburetor 75 is suitably attached. The intake passage 64 of the rotary valve 12 is connected with the carburetor 75 by having the outer end of the intake sleeve portion 63 of the valve extend into a recess 76$^a$ of the cover 76. A seal is formed around the intake sleeve portion 63 by an annular heat resistant packing 77 mounted in the cover recess 76$^a$.

A laterally extending portion of the gear case member 19 forms a cover 78 which is secured to the cylinder head 17 at the exhaust end thereof and has an internally shouldered central opening 79 therein communicating with the exhaust passage 80 of an exhaust pipe or manifold 81. The gear case members 19 and 20 define therebetween an upright gear chamber 82 in the column 21, and the above-mentioned gears 72, 73 and 74 are located in this gear chamber. The exhaust sleeve portion 65 of the valve 12 extends across the gear chamber 82 and into the cover opening 79 in which it is sealed by a suitable heat resistant packing 83.

The packing 83 is mounted in the internally shouldered opening 79 of the cover 78 and is retained therein by the flanged end 81$^a$ of the exhaust pipe 81. The exhaust pipe 81 has its flanged end 81$^a$ secured to the cover 78 by suitable studs 86.

In accordance with one feature of this invention, the intermediate portion 54$^a$ of the valve bore 54 is expansible and contractible substantially radially thereof for accommodating the intermediate portion 12$^a$ of the rotary valve 12 with a close-running fit throughout a wide range of variations in the operating temperature of the valve. For this purpose the wall of the bore 54 is provided with arcuately extending slots 88 and with radial access slots 89, such that the wall is divided into an annular group or series of yieldable arcuate segments 90 which are relatively free at one end thereof, while at the other end thereof they remain integrally attached to the wall.

The free or floating ends 90$^a$ of the segments 90 are radially shiftable by a flexing of the segments, such that they will hug the cylindrical periphery of the intermediate barrel portion 12$^a$ of the rotary valve and be slidably engaged by the latter while maintaining a relatively close-fitting relation therebetween, regardless of variations in the transverse dimension of the valve due to expansion and contraction thereof in response to temperature changes. The flexibility thus provided for the wall of the valve bore 54 prevails around the major portion of the periphery of this bore.

The arcuate and radial slots 88 and 89 of the wall of the valve bore 54 can be formed therein in any suitable manner, such as by sawing or coring, and can be formed in a liner sleeve mounted in such bore or, as here shown, can be saw cuts formed directly in an integral portion of the cylinder head 17.

As shown in Fig. 4, the arcuately extending slots 88 of the valve bore may comprise two forms of such arcuate slots, namely the slots 88$^a$ having end portions extending arcuately in opposite directions away from the radial or access slot 89, and slots 88$^b$ which extend in one direction only relative to an associated radial or access slot 89$^a$. If desired, drilled holes 91 can be initially formed in the wall of the bore 54 at locations corresponding with the junction of the radial slots 89 with the arcuate slots 88. The drilled holes 91 provide starting points for the saw blade in forming the arcuate slots 88ª.

Certain of the flexible segments of the wall of the valve bore 52, such as the lower segments 90ᵇ and 90ᶜ, are deflected substantially radially to press against the periphery of the rotary valve 12 on axially opposite sides of its ports 67 and 68. For this purpose, the wavy or corrugated flat spring 87 of Fig. 16 is inserted in an endwise axial relation in each of the arcuate slots 88ᵇ at an intermediate point of the latter, as shown in Figs. 3 and 4.

Packings in the form of filler strips 92 are preferably provided in the radial slots 89 and are positioned in a radially edge-wise relation to the rotary valve 12. The packing strips 92 substantially fill the radial slots 89 and, as shown in Figs. 11 and 12, have spring elements 93 formed by partially sheared integral portions of the strips. The spring elements 93 urge the packing strips 92 in a radial direction so as to project the inner edges of the strips from the slots and sealingly press such edges against the periphery of the rotary valve 12. The engagement of the edges of the strips 92 against the rotary valve 12 also serves to distribute and spread out the lubricant, which is supplied to the valve as explained hereinafter, into a thin film.

As shown in Figs. 7 and 8, the sealing shoe 59 is a ring member having a circular outside shape and containing the communicating port 58, which port is here shown as being of a generally quadrangular plan shape. The sealing shoe 59 has a cylindrically concave upper bearing surface 95 thereon, which is slidably engaged by the periphery of the rotary valve 12. On the lower side thereof, the shoe 59 is provided with a cylindrical axial portion 96 and an annular bevel defining a substantially 45° shoulder 97 at the inner end of such cylindrical portion.

The sealing shoe 59 is preferably made of a material having a high thermal conductivity so that heat will be readily conducted to or from this shoe. Any suitable material affording the desired high heat conductivity can be used and, for example, the shoe can be made of a lead-bronze alloy. An important advantage resulting from such high heat conductivity is that there will be no likelihood of a large amount of heat remaining in the shoe to cause burning thereof.

The sealing shoe 59 is mounted in a cylindrical recess or passage 98 defined in the cylinder head 17 by an annular wall 98ª and by an annular shoulder 99 disposed at right angles to such annular wall. The position of the shoe 59 in the recess 98 is with the end of the cylindrical portion 96 located at or adjacent the right-angle shoulder 99, such that the side wall of the cylindrical portion 96 and the bevel 97 cooperate with the side wall 98ª and the shoulder 99 in defining a closed annular packing groove 100.

Leakage of fluid between the sealing shoe 59 and the walls of the recess 98 is prevented by a packing ring 101 disposed in the groove 100. The packing ring 101 is of a triangular cross-sectional shape and is disposed with the base 102 of the triangle (see Fig. 13) seating against the side wall 98ª of the recess 98 and with the side 103 of the triangle lying against the annular bevel 97 of the shoe. The other side 104 of the triangular shape of the packing ring 101 is presented toward the shoulder 99 in an inclined relation thereto.

A spring ring 105 disposed in the groove 100 is located between the shoulder 99 and the inclined side 104 of the triangular shape of the packing ring 101. The ring 105 is a self-expanding ring, whose expansive pressure against the inclined face 104 of the packing ring 101 is effective on the packing ring to press the inclined face 103 of the latter against the bevel 97, thereby causing the base 102 of the triangular shape of the packing ring to be sealingly pressed against the side wall 98ª of the recess 98. The expansive action of the spring ring 105 is also effective on the shoe 59 for pressing the concave bearing face 95 thereof into sealing engagement with the periphery of the rotary valve 12.

The packing ring 101 is preferably made of material having a high heat conductivity so as to assist in the rapid transfer of heat between the shoe 59 and the cylinder head 17. The packing ring 101 can be made of suitable material having this property thus, for example, it can be made of aluminum-bronze alloy and can be suitably hardened. The spring ring 105 can, for example, be made of a high temperature-resistant spring steel.

The location above described for the groove 100 affords the advantage that when the packing ring 101 and the spring ring 105 are disposed therein, they are shielded from direct contact by heated gases which might otherwise have a deteriorating effect thereon. Another advantage realized is that with the above-described shape and location for the packing ring 105, its base 102 and its side face 103 are of large area and are in direct surface contact with areas of the head 17 and shoe 59, respectively, for a rapid and effective heat transfer.

Lubrication of the rotary valve 12 with a substantially correct amount of lubricant at the proper time is an important requirement and is accomplished in the engine 10. For this purpose a lubricant passage 106 is provided in the cylinder head 17 so as to extend along the bore 54 in a substantially parallel relation thereto. Lubricant under pressure is supplied to the outer end of the passage 106 through a vacuum-controlled metering device 107 which operates to automatically vary the amount of lubricant in accordance with the operation of the engine. The metering device 107 need not be described in detail since it is an intake suction responsive valve device of a construction comparable with what is shown in United States Patents 1,509,939 and 2,509,597. Lubricant under pressure is supplied to the metering valve device 107 through a conduit 108, and delivery conduits 109 conduct the lubricant from the outlets of the valve device 107 to the outer ends of the passages 106 with which they are connected through the covers 76.

The lubricant is fed to the bore 54 so as to be applied to the periphery of the intermediate portion 12ª of the valve at a point adjacent the bearing 70 and spaced from the valve ports 67 and 68. When lubricant is supplied to the valve at this point of its periphery, the lubricant will be distributed along the valve by the rotation thereof in the valve bore and by the packing strips 92. The lubricant is fed to the surface of the valve from the inner end of the supply passage 106 through a passage 110 provided in the stem of a screw 111 (see Fig. 5) which extends transversely to the passage 106 with a reduced portion 111ª of the stem of the screw extending across one of the arcuate slots 88.

The cross-sectional area of the passage 106 is reduced to an annular or crescent-shaped crevice 112 by the provision of a filler rod 113 therein to thereby decrease the oil capacity of the passage 106 without rendering difficult the machining needed to produce this passage. The rod 113 is retained in the passage 106, against the ejecting force of a compression spring 114, by the cover 76. Since the reduced passage 106 is in the form of the crevice 112, it will form a restriction preventing any excessive amount of lubricant from being supplied to the valve but will not readily become clogged. Moreover, the filler rod 113 is relatively loose in the passage 106 so as to be subject to shifting therein due to vibration and inertia effects thereon, and this shifting of the filler rod in the passage further tends to prevent clogging of the passage. The restriction of the passages 106 to the crevices 112 assists in equalizing the distribution of the lubricant being supplied to a plurality of the rotary valves 12.

The portions of the valve bore 54 immediately adjacent the bearings 69 and 70 form annular lubricant collecting pockets 115 and 116. Any excess of lubricant which is supplied to the rotary valve 12 through the feed passage 110 is collected in these pockets 115 and 116 and is removed therefrom through the drain passage 118 leading from the pocket 115 and the extension passage 118a leading from the pocket 116, and is returned to the crankcase 14 through the conduit 119. Some of the lubricant which collects in the pocket 115 will serve to lubricate the bearing 69.

The annular pockets 115 and 116 have their inner or axially adjacent side walls formed by radially-edgewise disposed plate rings 115a and 116a (see Fig. 5) which have a press fit engagement in the cylinder head 17 with their outer peripheral edges seated in circumferential grooves 117. The plate rings 115a and 116a assist in defining the annular pockets 115 and 116 and also prevent cross communication therebetween through the arcuate slots 88 and the radial slots 89a of the cylinder head.

For the purpose of lubricating the gears of the gear train contained in the gear column 21, a stream or spray of lubricant is directed into the gear chamber 82 at a suitable upper point thereof through a delivery port or nozzle 120 (see Figs. 1 and 6). Lubricant is supplied under pressure to the port 120 through a passage 121 which, in this case, is provided in the gear case member 20 and whose lower end is connected with the fitting 50 by a conduit 122. The amount of lubricant being discharged into the chamber 82 through the port 120 is controlled by the point 123 of an adjustable metering screw 124. The lubricant supply passage 121 extends beyond the delivery port 120 and also serves as the lubricant supply passage with which the conduit 108 leading to the above-mentioned metering valve device 107 is connected. The conduit 108 is connected with the supply passage 121 through the fitting 125.

The oil pump 41 has a constant-pressure delivery such that whenever the engine 10 is in operation an adequate supply of lubricant under suitable pressure will be available in the passage 112 leading to the port 120 and in the conduit 108 leading to the metering valve device 107. As the speed and load conditions of the engine vary, the metering valve device 107 will automatically regulate the amount of lubricant being fed to the rotary valve 12. The operation of valve device 107 is preferably such that very little, if any, lubricant is fed to the rotary valve 12 when the engine is idling.

Cooling of the exhaust end of the rotary valve 12 is important and is accomplished to an increased extent in the engine 10 of the present invention by providing heat-dissipating surfaces on the exhaust stem portion 65. These heat-dissipating surfaces include a group of annular heat-radiating fins 129 which are here shown as being carried by a collar 128. The collar 128 is made of a metal having a high heat conductivity, such as copper or brass, and is mounted on the exhaust sleeve portion 65 between the gear 74 and the inner race of the bearing 70. In this location the collar 128 also serves as a spacer, which is clamped between the gear and the inner bearing race by the nut 130.

The supply of lubricant being sprayed into the gear chamber 82 of the gear column 21 through the port 120, strikes the adjacent face of the gear 73 and is thrown by the latter so that the lubricant flows across and bathes the cooling collar 128, as well as other adjacent heat-dissipating surfaces, and absorbs heat therefrom. The velocity spray effect of the lubricant being discharged into the chamber 82 from the port 120 also causes such lubricant to directly contact the heat-radiating fins 129, as well as various other parts and surfaces in this chamber.

The absorption of heat from the valve 12 through the surfaces and fins 129 by the lubricant prevents overheating of the valve and the heat thus extracted from the valve is carried away by the lubricant and is dissipated to the atmosphere, particularly through the cooling fins of the crankcase portion of the body structure 13. The transfer of heat from the exhaust end of the rotary valve 12 to the lubricant is also desirable as a means for heating the lubricant supply of the crankcase 14 when the engine is being started up from a cold condition.

The packing 77 prevents lubricant, which passes through the bearing 69, from leaking into the intake passage 64. Similarly, the packing 83 prevents lubricant which is supplied to the chamber 79 from leaking into the exhaust passage 66.

The crankcase 14 is suitably vented, as through a conventional atmospheric breather valve 135. In the event that a pressure condition occurs in the crankcase nevertheless, it is important that the pressure be prevented from being communicated, as an oil mist or otherwise, to the rotary valve 12 through the gear column 21 and the conduit 119. For this purpose, a check-valve type of shield 136 is provided at the bearing 70 and a check valve 137 is provided at the upper end of the conduit 119.

As shown in Fig. 14, the shield 136 comprises a stationary annular member 138 clamped against a portion of the cylinder head 17 by the outer race of the bearing 70, and a relatively thin resilient annular member 139 rotatable with the inner race of this bearing. The annular member 138 has an annular valve seat element 138a thereon which is normally engaged by the member 139 with the latter member acting as a check valve. The member 139 can be connected with the inner race of the bearing 70 by having a press fit engagement in an annular end recess of that race.

The check valve member 139 prevents oil or crankcase pressure from passing through the bearing 70 into the annular pocket 116 and will also permit excess lubricant to escape from the pocket 116 through this bearing into gear chamber 82. Since the shield formed by the members 138 and 139 is on the end of the bearing 70 which faces the pocket 116, it will not prevent lubrication and cooling of this bearing by oil from the gear chamber 82.

As shown in Fig. 15, the check valve 137 is a disk disposed in a recess 140 of the cover 76 and is urged toward engagement with the transverse bottom wall of the recess by a coil spring 141.

From the accompanying drawings and the foregoing detailed description it will now be readily understood that this invention provides an internal combustion engine of a novel construction having rotary valves for controlling the intake and exhaust communication with the power cylinders, and in which the rotary valves will operate in an efficient and satisfactory manner with minimum attention and servicing throughout a prolonged period of service. Many of the advantages obtained in the engine 10 have already been explained above, and therefore, need not be here repeated.

Although the engine of the present invention and the rotary valves thereof have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an internal combustion engine, a body unit having a cylinder and a valve bore therein and a port connecting said cylinder with said bore, a valve rotatable in said bore and controlling said port, and means in said unit comprising a yieldable annular wall defining said bore and providing for expansion and contraction of said bore, said wall comprising an arcuate series of permanently joined flexibly supported curved wall segments extending around the major portion of the perimeter of the bore.

2. In an internal combustion engine, a body unit having a cylinder and a valve bore therein and a port connecting said cylinder with said bore, a valve rotatable in said bore and controlling said port, and means in said unit comprising an arcuately and radially slotted yieldable annular wall defining the perimeter of said bore and being expandable and contractable for varying the transverse dimension of said bore, said wall comprising an arcuate series of curved wall segments flexibly supported by said unit and formed by integral portions of the latter.

3. In an internal combustion engine, a body unit having a cylinder and a valve bore therein and a port connecting said cylinder with said bore, and a valve rotatable in said bore and controlling said port, said unit having an integrally formed portion comprising an arcuate wall defining the perimeter of said bore, said wall having substantially radial slots therein at arcuately spaced points and arcuately extending slots emanating from said radial slots, said wall being yieldable by reason of the presence of said slots therein for expansion and contraction of said bore and the wall material encompassed by said slots comprising an arcuate series of permanently joined and flexibly supported curved wall segments.

4. In an internal combustion engine, a body unit having a cylinder and a valve bore therein and a port connecting said cylinder with said bore, antifriction bearings in said unit on axially opposite sides of said port, a valve controlling said port and supported by said bearings for rotation in said bore, and means in said unit defining the perimeter of said bore between said bearings comprising an arcuate wall slidably engaged by the periphery of said valve during the rotation of the latter, said wall having arcuate slots and radial slots therein partially isolating portions of said wall with respect to said unit, the partially isolated wall portions comprising curved segments spaced apart circumferentially around said bore by said radial slots and lying between said arcuate slots and said bore, said slots and segments providing flexibility in said wall around the major portion of the perimeter of said bore for variation of the transverse dimension of the bore to accommodate radial expansion and contraction of said valve.

5. An engine as defined in claim 4 in which said slots are saw cuts or the like formed in said wall and comprise relatively short radial slots and relatively long arcuate slots emanating from said radial slots, and in which said segments have integrally jointed support ends at one end of their arcuate curvature and are relatively free at the other end of their arcuate curvature.

6. In an internal combustion engine, a body unit having a cylinder and a valve bore therein and a port connecting said cylinder with said bore, a valve rotatable in said bore and controlling said port, means in said unit comprising an arcuate wall defining the perimeter of said bore, said wall having arcuate slots and radial slots therein partially isolating portions of said wall with respect to said unit, the partially isolated wall portions comprising curved segments spaced apart circumferentially around said bore by said radial slots and lying between said arcuate slots and said bore, said slots and segments providing flexibility in said wall around the major portion of the perimeter of said bore for variation of the transverse dimension of the bore to accommodate radial expansion and contraction of said valve, and springs extending axially along said bore and located within said arcuate slots for urging said segments against said valve.

7. In an internal combustion engine, a body unit having a cylinder and a valve bore therein and a port connecting said cylinder with said bore, a valve having intake and exhaust passages therein and being rotatable in said bore for controlling said port, an annular wall defining the perimeter of said bore, said wall having substantially radial slots therein at arcuately spaced points and arcuately extending slots emanating from said radial slots, said wall being yieldable by reason of the presence of said slots therein for variation of the transverse dimension of said bore in response to radial expansion and contraction of said valve, the wall material encompassed by said slots comprising an arcuate series of permanently joined and flexibly supported curved wall segments extending around the major portion of the periphery of said bore, and filler elements disposed in said radial slots and having their inner axial edges presented to the periphery of said valve.

8. An engine as defined in claim 7 which includes spring means in said radial slots and effective for pressing said inner axial edges of said filler elements against said valve.

9. In an internal combustion engine, a body unit having a cylinder and a valve bore therein, said unit also having a connecting passage therein extending between said cylinder and bore and including a cylindrical passage portion intersecting said bore substantially radially thereof, a valve rotatable in said bore and controlling said passage, means defining an internal shoulder extending around said passage and facing toward said bore, an externally cylindrical shoe disposed in said passage portion coaxially thereof, said shoe having a concave face slidably engaged by said valve and an external annular shoulder thereon in opposed spaced relation to said internal shoulder, and a packing confined between said shoulders and having sealing engagement with one of said shoulders and with the side wall of said passage portion.

10. An internal combustion engine as defined in claim 9 in which said packing comprises a packing ring and an expander ring engaging the packing ring, said expander ring being effective on said packing ring to sealingly press the same against one of said shoulders and against the side wall of said passage portion and being also effective on said shoe for pressing said concave face against said valve.

11. In an internal combustion engine, a body unit having a cylinder and a substantially cylindrical valve bore therein, said unit also having a substantially cylindrical connecting passage therein extending between and connecting said cylinder and bore, a substantially cylindrical valve rotatable in said bore and controlling said passage, a shoe in said passage and having at one end thereof a concave bearing portion slidably engaged by said valve, means on said unit defining an internal annular shoulder facing said bore and extending around said passage adjacent the cylinder end thereof, cooperating annular portions of said unit and shoe defining an annular pocket therebetween which has said shoulder as a first transverse end wall at the cylinder end of the pocket, an external annular bevel on said shoe and forming a second end wall for said pocket and located substantially opposite said first end wall, a packing ring in said pocket and having two annular faces in a sealing and heat-transfer engagement with said bevel and the side wall of said passage, and a spring expander ring in said pocket and wedgingly effective between said first end wall and said packing ring for pressing said two faces of the latter into said sealing and heat-transfer engagement with said bevel and side wall.

12. An engine as defined in claim 11 in which said packing ring is formed of material having a high thermal conductivity.

13. An engine as defined in claim 11 in which said packing ring is of a triangular cross-sectional shape, and in which the wedging engagement of said expander ring with said packing ring is against the face of the latter corresponding with the third side of the triangular shape.

14. In a rotary valve internal combustion engine, a body unit having a cylinder and a valve bore therein, said unit also having a connecting passage therein extending between said cylinder and bore and including a port at one end of said connecting passage communicating with said cylinder and a cylindrical passage portion intersecting said bore substantially radially thereof, a valve having intake and exhaust passages therein and being rotatable in said bore for controlling said connecting passage, means on said unit defining an internal annular shoulder facing said bore and extending around said connecting passage at the inner end of said passage portion, an externally cylindrical shoe disposed in said passage portion coaxially thereof and having a concave bearing face slidably engaged by said valve, said shoe having an opening therein intersecting said bearing face and registering substantially with said port and an external annular shoulder in opposed axially spaced relation to said internal shoulder, one of said shoulders being a beveled shoulder and the other being a substantially flat radial shoulder, a packing ring of a substantially triangular cross-section disposed between said shoulders with a first face of the triangular shape sealingly engaging said beveled shoulder and a second face of the triangular shape sealingly engaging the side wall of said passage portion, and an expander ring disposed between said radial shoulder and the third face of said triangular shape, said expander ring being wedgingly effective on said packing ring for causing said sealing engagement thereof with wall and beveled shoulder and for causing said bearing face to be pressed against said valve.

15. In an internal combustion engine, a body unit having a cylinder and a valve bore therein and a port connecting said cylinder with said bore, a valve rotatable in said bore for controlling said port and having an axial sleeve portion defining an exhaust pasage, heat dissipating surfaces carried by said sleeve portion, and means for causing fluid coolant to flow in heat-exchange relation to said surfaces.

16. An engine as defined in claim 15 and having a lubricant distributing means including a pump, and in which the fluid coolant is lubricant supplied by said distributing means.

17. An engine as defined in claim 15 in which a ring made of metal of a high heat conductivity is mounted on said axial sleeve portion and has a group of heat dissipating fins integrally formed thereon.

18. In an internal combustion engine, a body unit having a cylinder and a valve bore therein and a port connecting said cylinder with said bore, said unit also having a chamber therein adjacent one end of said bore, a valve rotatable in said bore for controlling said port, said valve having an axial exhaust sleeve portion extending into said chamber, heat dissipating surfaces on said exhaust sleeve portion and disposed in said chamber, and means for supplying fluid coolant to said chamber for contact with said surfaces.

19. In an internal combustion engine, a body unit having a cylinder and a valve bore therein and a port connecting said cylinder with said bore, said unit also having a chamber therein adjacent one end of said bore, a valve rotatable in said bore for controlling said port, said valve having an axial exhaust sleeve portion extending into said chamber, means for rotating said valve including gear means in said chamber, and means for supplying oil to said chamber for lubricating said gear means and for cooling contact with said exhaust sleeve portion.

20. In an internal combustion engine, a body unit having a cylinder and a valve bore therein and a port connecting said cylinder with said bore, said unit also having a chamber therein adjacent one end of said bore, a valve rotatable in said bore for controlling said port, said valve having an axial intake sleeve portion on one end thereof and at the other end thereof having an axial exhaust sleeve portion extending into said chamber, means for rotating said valve including gear means in said chamber, heat dissipating fins carried by said exhaust sleeve portion and disposed in said chamber, and means for supplying oil to said chamber for lubricating said gear means and for cooling contact with said fins.

21. In an internal combustion engine, a body unit having a cylinder and a valve bore therein, a valve rotatable in said bore for controlling intake and exhaust communication with said cylinder, a lubricant passage in said unit adjacent said bore and extending in the general direction of the axis of the bore, means for supplying lubricant under pressure to said passage adjacent the outer end thereof, means for feeding lubricant to said bore from said passage adjacent the inner end thereof, and a filler member extending axially in said passage and reducing the cross-sectional area and volume of the latter to a relatively narrow substantially annular space between the inner and outer surfaces of said passage and member, said space defining a conduit portion adapted to contain only a relatively small volume of lubricant and providing for a free flow of the lubricant therein to the feeding means.

22. Engine construction as defined in claim 21 in which said filler member is movable in said passage in response to vibration and inertia effects thereon.

23. An internal combustion engine comprising, a body unit having a cylinder and a valve bore therein, said body unit also including a crankcase having a lubricant reservoir therein, a valve rotatable in said valve bore for controlling intake and exhaust communication with said cylinder, antifriction bearings spaced axially of said bore and supporting said valve for the rotation thereof, means for supplying lubricant to said valve from said reservoir, said unit having lubricant collecting pockets therein adjacent the respective antifriction bearings, and means for defining lubricant return passage means extending from said pockets to said crankcase.

24. An engine as defined in claim 23 in which a portion of said unit defining the wall of said bore has arcuately spaced substantially radial slots therein extending axially of the bore between said pockets, and in which filler elements are disposed in and substantially coextensive with said slots longitudinally of the latter and have their inner axial edges in engagement with said valve.

References Cited in the file of this patent

UNITED STATES PATENTS

| | | |
|---|---|---|
| 1,160,113 | Shaffer | Nov. 9, 1915 |
| 1,210,672 | Morse | Jan. 2, 1917 |
| 2,265,298 | Ludwig | Dec. 9, 1941 |
| 2,354,305 | Cross | July 25, 1944 |
| 2,725,043 | Bacot | Nov. 29, 1955 |